(12) United States Patent
Chen et al.

(10) Patent No.: US 8,184,749 B2
(45) Date of Patent: May 22, 2012

(54) SPHERE DECODING METHOD APPLIED TO MULTI-INPUT MULTI-OUTPUT (MIMO) CHANNEL

(75) Inventors: Yen-Chih Chen, Hsinchu (TW); Tsung-Chun Cheng, Taipei County (TW); Der-Zheng Liu, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 327 days.

(21) Appl. No.: 12/562,332

(22) Filed: Sep. 18, 2009

(65) Prior Publication Data
US 2010/0074376 A1 Mar. 25, 2010

(30) Foreign Application Priority Data
Sep. 19, 2008 (TW) ................................ 97136184 A

(51) Int. Cl.
*H04L 27/06* (2006.01)
(52) U.S. Cl. ........................................................ 375/340
(58) Field of Classification Search .................. 375/340, 375/262, 267, 341, 316; 455/214, 337; 370/203, 370/330, 338
See application file for complete search history.

(56) References Cited

U.S. PATENT DOCUMENTS

| | | |
|---|---|---|
| 2005/0135498 A1 | 6/2005 | Yee |
| 2006/0188044 A1 | 8/2006 | Wang et al. |
| 2009/0232241 A1* | 9/2009 | Shabany et al. ............... 375/262 |
| 2010/0054365 A1* | 3/2010 | Cheng et al. .................. 375/320 |

OTHER PUBLICATIONS

Office Action issued in on Dec. 15, 2011, in related U.S. Appl. No. 12/562,351 (copy not provided).

* cited by examiner

*Primary Examiner* — Khai Tran
(74) *Attorney, Agent, or Firm* — Thomas, Kayden, Horstemeyer & Risley, LLP

(57) ABSTRACT

A sphere decoding method applied to a MIMO channel is provided. Multiple constellation points of an $n^{th}$ detection layer corresponding to a MIMO channel matrix are enumerated based on an enumeration rule, and at least one $n^{th}$ sub-set of the $n^{th}$ detection layer is defined. The candidate range of the constellation points of the at least one $n^{th}$ sub-set is determined according to a predetermined number K of the preferred points of the at least one $n^{th}$ sub-set. K constellation points are obtained from the at least one $n^{th}$ sub-set as the preferred points according to partial Euclidean distances of the constellation points. The at least one $n^{th}$ sub-set includes at least K constellation points. $K_n$ preferred points are selected from all K preferred points of the at least one $n^{th}$ sub-set. An optimal solution is determined according to the $K_n$ preferred points.

18 Claims, 9 Drawing Sheets

SPHERE DECODING METHOD APPLIED TO MULTI-INPUT MULTI-OUTPUT (MIMO) CHANNEL

This application claims the benefit of Taiwan application Serial No. 97136184, filed Sep. 19, 2008, the subject matter of which is incorporated herein by reference.

BACKGROUND OF THE INVENTION

1. Field of the Invention

The invention relates in general to a sphere decoding method applied to a multi-input multi-output (MIMO) channel, and more particularly to a sphere decoding method applied to a MIMO channel capable of reducing system complexity.

2. Description of the Related Art

With the development of the wireless communication technology, standards of wireless local area network have evolved from 802.11a/b/g standard for single-input single-output (SISO) mode into 802.11n standard for multi-input multi-output (MIMO) mode, so as to meet the requirement of high speed data transmission. The MIMO technology utilizes multiple transmission antennas and reception antennas for respectively transmitting and receiving signals. As compared with the conventional SISO system, the MIMO system can provide multiple parallel data streams on the same frequency band at the same time, thereby increasing the data transmission amount by multiples.

The MIMO system has to effectively use an equivalent channel with orthogonal characteristics in space to transmit the multiple parallel data streams on the same frequency band. However, the equivalent channel with orthogonal characteristics in space decays to different extents depending on geometric arrangement and element characteristic of the transmission antennas and reception antennas and geometric and statistic features of the transmission paths. Therefore, signal detection becomes an important issue in MIMO system design. In general, the complexity of a signal detection system is raised for reducing the error rate of signal reception.

In present signal detection methods, the maximum likelihood (ML) rule can provide the optimal receiving performance, but increase the complexity of the signal detection system to a too-high extent, causing difficulties in hardware implementation. Therefore, a sphere decoding method is developed to simultaneously have a receiving performance close to that of the maximum likelihood rule and suitable system complexity. In the sphere decoding method, a K-Best breadth-first sphere decoding method is very suitable for hardware implementation because of its fixed throughput and fixed complexity.

The receiving performance of the K-Best sphere decoding method is determined by a value of K. if the value of K gets larger, the signal receiving performance becomes higher, but the system complexity is increased. If the value of K gets smaller, the system complexity is decreased, but the signal receiving performance becomes lower. Therefore, in the K-Best sphere decoding method, the value of K has to be determined to meet the requirements of system complexity and receiving performance. In addition, in the K-Best sphere decoding method, each detection layer includes M constellation points, wherein M is a positive integer. In the K-best sphere decoding method, each detection layer receives K preferred points from the previous detection layer, and K×M partial Euclidean distances have to be calculated and then sorted to obtain K preferred points of the present detection layer to transfer to the next detection layer.

If T signals are transmitted via the MIMO channel, the K-Best sphere decoding method corresponds to T detection layers in the complex domain, wherein T is a positive integer. Thus, the K-best sphere decoding method has to calculate the partial Euclidean distances M+(T−2)×K×M+K times and perform a sorting operation once every detection layer. However, as for a high-order MIMO system, when the MIMO channel decays to a more serious extent or orthogonal characteristics are insufficient, the value of K has to be increased to enhance the receiving performance of the system. Consequently, the system complexity greatly increases by a multiple of (T−2)×M, thereby enlarging the area of the chip processor, increasing power consumption and reducing data processing amount.

SUMMARY OF THE INVENTION

The invention is directed to a sphere decoding method applied to a multi-input multi-output (MIMO) channel. Based on the Schnorr & Euchner (SE) enumeration rule, the corresponding preferred points can be obtained from a part of constellation points in each detection layer, thereby reducing the detection complexity of the sphere decoding method, and maintaining the signal receiving performance of the system.

According to an aspect of the present invention, a sphere decoding method applied to a MIMO channel is provided. Multiple constellation points of an $n^{th}$ detection layer corresponding to a MIMO channel matrix are enumerated based on an enumeration rule, and at least one $n^{th}$ sub-set of the $n^{th}$ detection layer is defined. The candidate range of the constellation points of the at least one $n^{th}$ sub-set is determined according to a predetermined number K of the preferred points of the at least one $n^{th}$ sub-set, K being a positive integer. K constellation points are obtained from the at least one $n^{th}$ sub-set as the preferred points according to partial Euclidean distances of the constellation points. The at least one $n^{th}$ sub-set includes at least K constellation points. $K_n$ preferred points are selected from all K preferred points of the at least one $n^{th}$ sub-set, wherein $K_n$ is a positive integer less than or equal to a total number of all the K preferred points of the at least one $n^{th}$ sub-set. An optimal solution is determined according to the $K_n$ preferred points.

The invention will become apparent from the following detailed description of the preferred but non-limiting embodiments. The following description is made with reference to the accompanying drawings.

DETAILED DESCRIPTION OF THE INVENTION

The invention is directed to a sphere decoding method applied to a MIMO channel. Based on the SE enumeration rule, the corresponding preferred points can be obtained respectively in the complex domain and the real domain from a part of constellation points in each detection layer according to the corresponding SNR of each detection layer, thereby reducing the detection complexity of the sphere decoding method and maintaining the signal receiving performance of the MIMO system.

Figure 1:
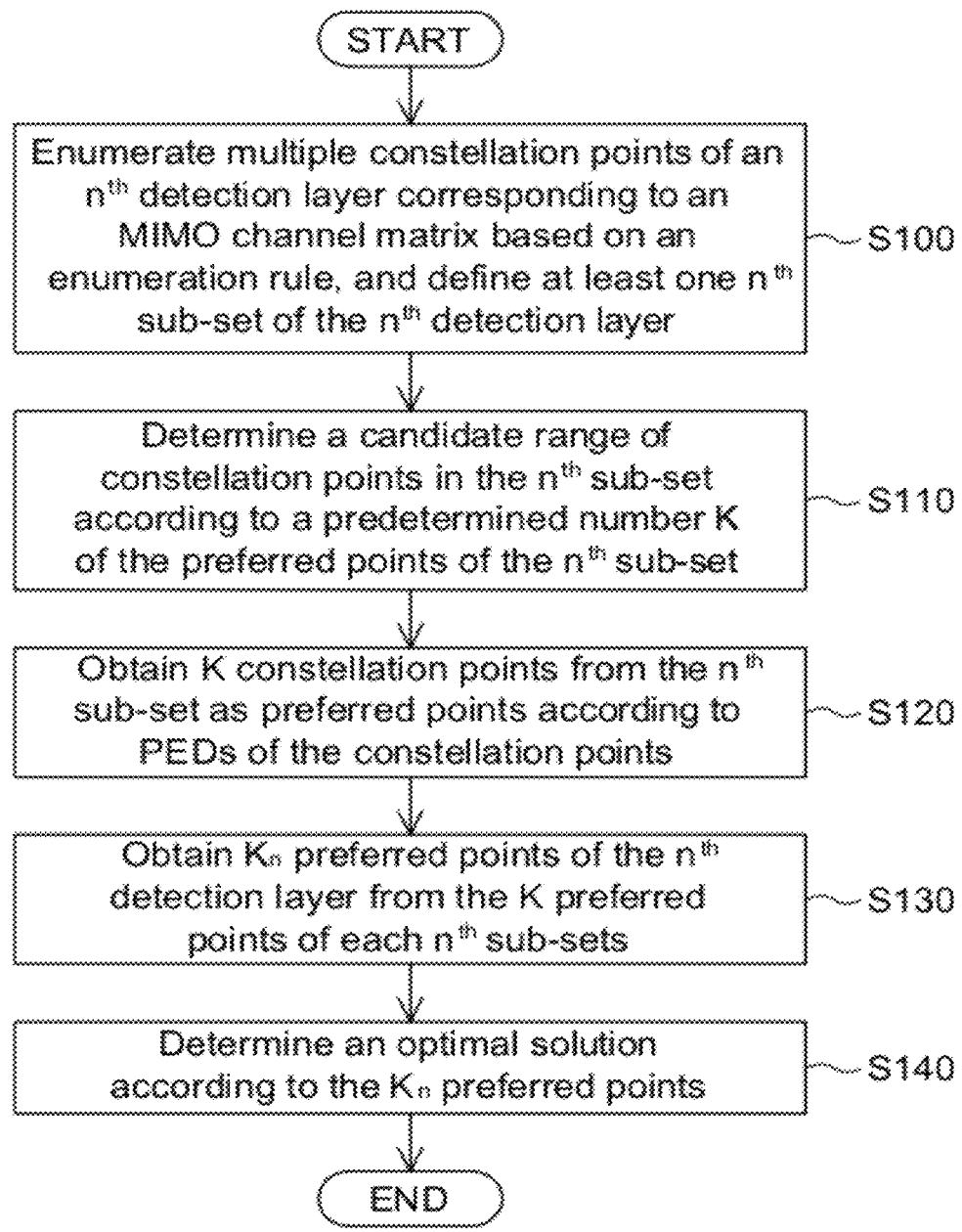
FIG. 1 is a flowchart of a sphere decoding method applied to a MIMO channel according to a preferred embodiment of the invention.

FIG. 1 is a flowchart of a sphere decoding method applied to a MIMO channel according to a preferred embodiment of the invention. Referring to FIG. 1, in step S100, multiple constellation points in an $n^{th}$ detection layer corresponding to a MIMO channel matrix are enumerated based on an enumeration rule, and at least one $n^{th}$ sub-set of the $n^{th}$ detection layer is defined. The enumeration rule can be, for example, an SE enumeration rule. In step S110, a candidate range of constellation points in the at least one $n^{th}$ sub-set is determined according to a predetermined number K of the preferred points of the at least one $n^{th}$ sub-set, wherein K is a positive integer. In step S120, K constellation points are obtained from the at least one $n^{th}$ sub-set as preferred points according to partial Euclidean distances (PEDs) of the constellation points, wherein the $n^{th}$ sub-set includes at least K constellation points. The constellation points, obtained from the $n^{th}$ sub-set and served as the preferred points, are K constellation points with the least PEDs. In step S130, $K_n$ preferred points of the $n^{th}$ detection layer are obtained from all the K preferred points of the at least one $n^{th}$ sub-set, wherein $K_n$ is a positive integer less than or equal to a total number of all the K preferred points of the at least one $n^{th}$ sub-set. In step S140, an optimal solution is determined according to the $K_n$ preferred points. $K_n$, the number of preferred points of the $n^{th}$ detection layer, can be determined by the characteristic of the MIMO channel matrix.

Embodiments of the sphere decoding method, which are respectively applied in the complex domain and the real domain, are taken as examples for elaboration as follows.

Embodiment One

The sphere decoding method applied to a MIMO channel of this embodiment is applied in the complex domain, which includes the following steps of: a. receiving T signals transmitted via a MIMO channel, wherein T is a positive integer, and the MIMO channel is characterized by a channel matrix; b. generating a triangle matrix corresponding to the channel matrix, wherein the triangle matrix corresponds to a first detection layer to a $T^{th}$ detection layer; c. obtaining a first zero-forcing soft-output solution corresponding to the first detection layer, and obtaining $K_1$ preferred points P(1) of the first detection layer based on the SE enumeration rule; d. obtaining $K_{(n-1)}$ $n^{th}$ zero-forcing soft-output solutions corresponding to an $n^{th}$ detection layer according to $K_{(n-1)}$ preferred points P(n-1) of the $(n-1)^{th}$ detection layer, selecting multiple $n^{th}$ constellation points corresponding to the $K_{(n-1)}$ $n^{th}$ zero-forcing soft-output solutions based on the SE enumeration rule, and obtaining $K_n$ preferred points P(n) of the $n^{th}$ detection layer according to the corresponding PEDs of the $n^{th}$ constellation points, wherein n is a positive integer from 2 to (T-1); and e. obtaining $K_{(T-1)}$ $T^{th}$ zero-forcing soft-output solutions corresponding to a $(T-1)^{th}$ detection layer according to $K_{(T-1)}$ preferred points P(T-1) of the $(T-1)^{th}$ detection layer, obtaining $K_T$ preferred points P(T) of the $T^{th}$ detection layer based on the SE enumeration rule, and obtaining an optimal solution corresponding to the T signals according to one of the preferred points P(T) corresponding to the least PED. $K_1$ to $K_T$ are positive integers, and $K_1$ to $K_T$ can be, for example, but non-limitedly, the same of different.

Figure 2:
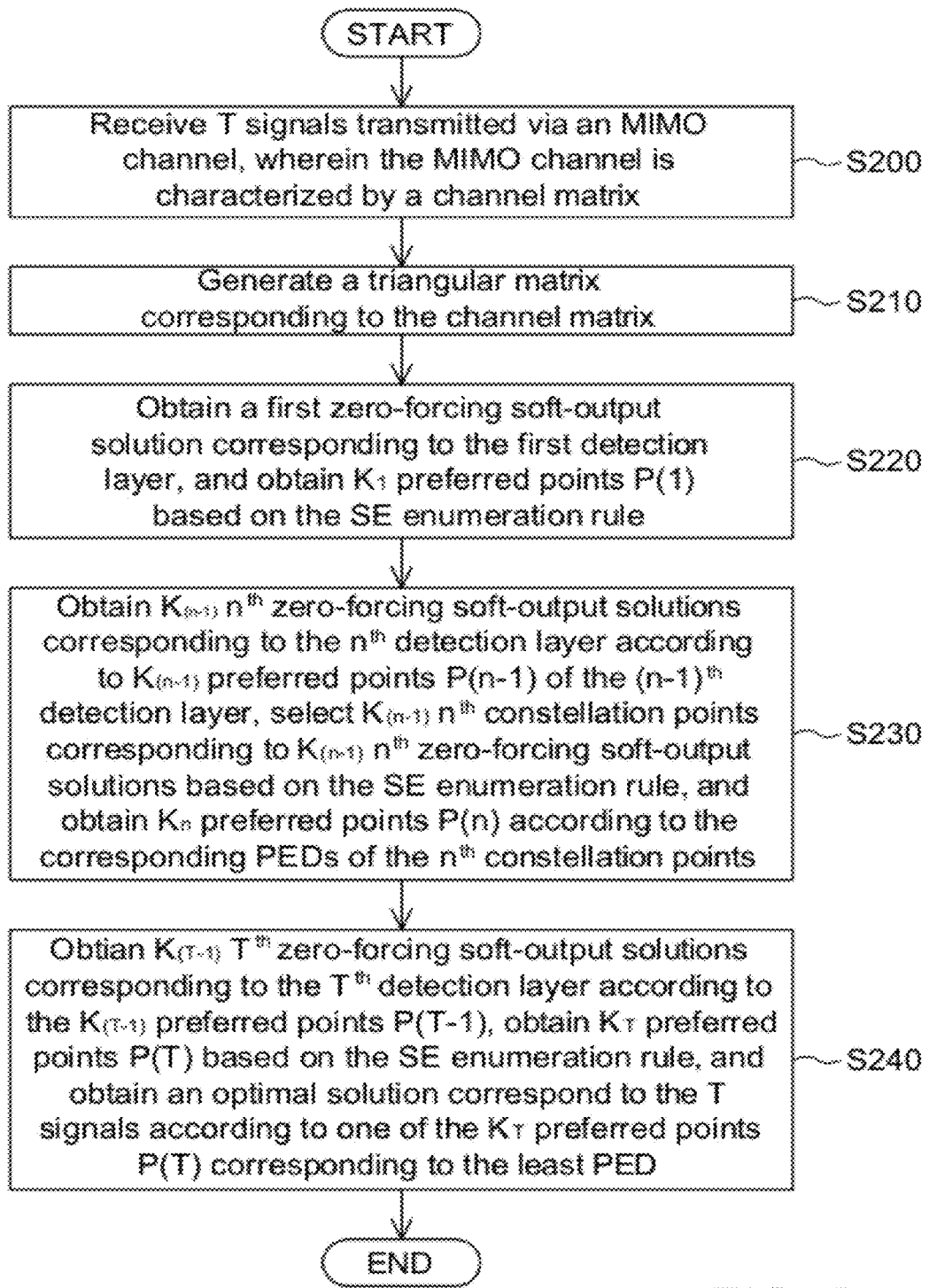
FIG. 2 is a flowchart of a sphere decoding method applied to a MIMO channel according to a first embodiment of the invention.

Further detailed description is provided below. FIG. 2 is a flowchart of a sphere decoding method applied to a MIMO channel according to a first embodiment of the invention. Referring to FIG. 2, first, in step S200, T signals transmitted via a MIMO channel are received. The MIMO channel is characterized by a channel matrix. Preferably, R' reception antennas are used to receive T signals transmitted by T transmitter antennas via the MIMO channel, wherein R' is a positive integer. The channel matrix is an R'×T channel matrix H. The MIMO system represented in the time domain or the frequency domain can be defined as follows:

$$r = Hx + n \qquad (1)$$

wherein, the R'×1 matrix r represents the signals received by the R' reception antennas, the T×1 matrix x represents the signals transmitted by the T transmission antennas, and the R'×1 matrix n represents noise.

Next, in step S210, a Q-R decomposition is performed on the channel matrix H to generate a triangular matrix, and the triangular matrix corresponds to a first detection layer to a $T^{th}$ detection layer. Preferably, the first detection layer to the $T^{th}$ detection layer respectively correspond to rows of the triangular matrix having the most "0" elements, the secondly most "0" elements, . . . , the least "0" elements. By performing the above Q-R decomposition, it can be obtained:

$$H = QR$$

wherein, Q is an R'×T matrix, and R is a T×T triangular matrix. The triangular matrix R is, for example, but non-limitedly, an upper triangular matrix. After the step S210, according to the equality formula (1), another equality formula of the MIMO system can be obtained as following:

$$y = Q^H r = Rx + Q^H n \qquad (2)$$

wherein, the matrix product of $Q^H$ and Q is a unit matrix I. If the noise item $Q^H n$ in the equality formula (2) is omitted, and the triangular matrix is an upper triangular matrix, the equality formula (2) can be expanded in a matrix form as followings:

$$\begin{bmatrix} y_1 \\ y_2 \\ y_3 \\ \vdots \\ y_T \end{bmatrix} = \begin{bmatrix} r_{11} & r_{12} & r_{13} & \cdots & r_{1T} \\ 0 & r_{22} & r_{23} & \ddots & r_{2T} \\ 0 & 0 & r_{33} & \ddots & r_{3T} \\ \vdots & \vdots & \ddots & \ddots & \vdots \\ 0 & 0 & 0 & 0 & r_{TT} \end{bmatrix} \begin{bmatrix} x_1 \\ x_2 \\ x_3 \\ \vdots \\ x_T \end{bmatrix} \quad (3)$$

wherein, $y_p$ and $y_{pq}$ are given, p is a positive integer from 1 to T, and q is a positive integer from 1 to T. This embodiment finds the optimal solution of $x_1$ to $x_T$ by using the values of given $y_p$ and $y_{pq}$.

In the equality formula (3), the equation $y_T = r_{TT} x_T$ corresponding to $x_T$ is defined as the first detection layer; the equations corresponding to $x_{T-1}, \ldots, x_2$ are defined as the second to $(T-1)^{th}$ detection layers; and the equation $y_1 = r_{1T} x_T + \ldots + r_{11} x_1$ corresponding to $x_1$ is defined as the $T^{th}$ detection layer. Each detection layer includes M constellation points, wherein M is a positive integer.

Figure 3:
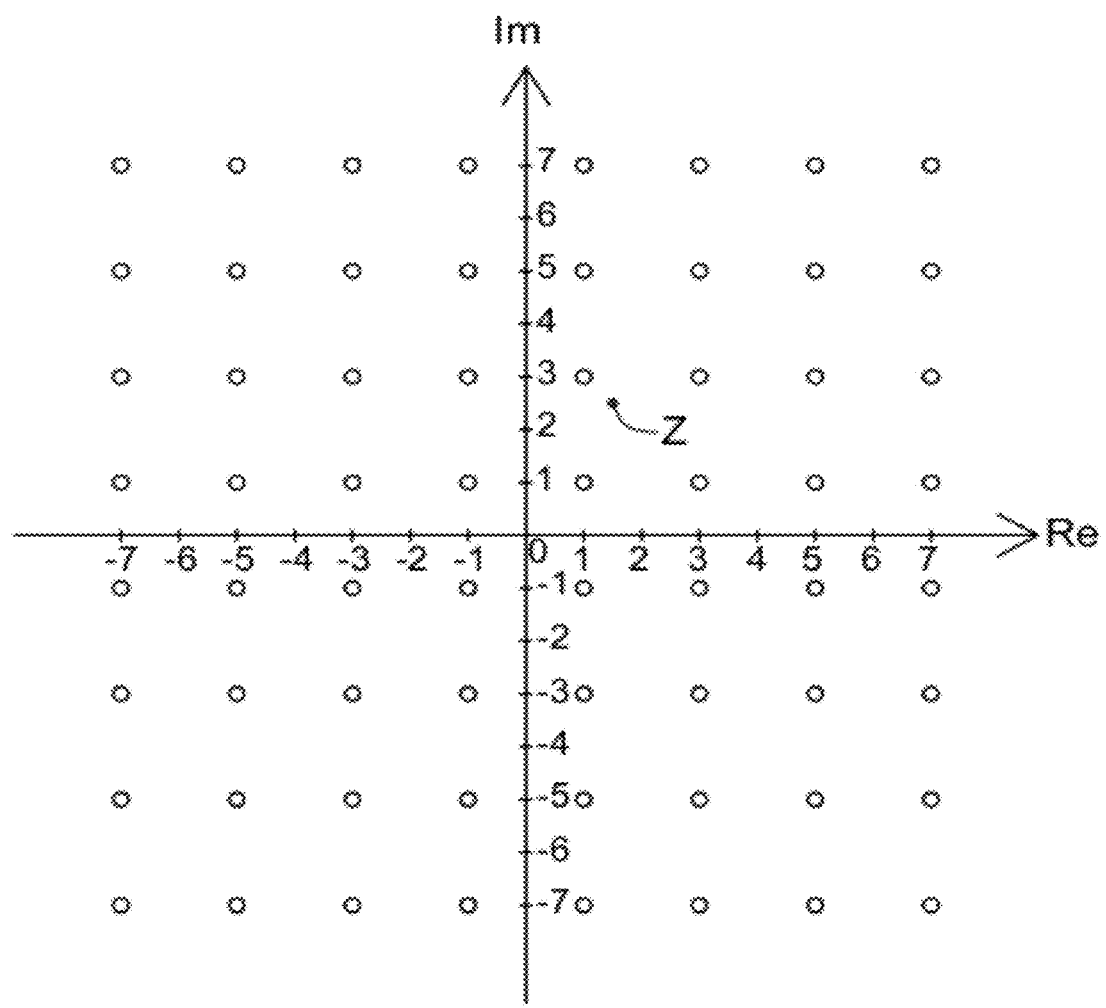
FIG. 3 shows a schematic illustration of constellation points of a detection layer of the sphere decoding method.

FIG. 3 shows a schematic illustration of constellation points of a detection layer of the sphere decoding method. Referring to FIG. 3, each detection layer is exemplified to include 64 constellation points (symbolized by hollow dots) for illustration, but is not limited thereto. The K-Best sphere decoding method generates $K_n$ preferred points corresponding to the $n^{th}$ detection layer, wherein $K_n$ is less than M.

Then, in step S220, a first zero-forcing soft-output solution corresponding to the value $x_T$ of the first detection layer is obtained and $K_1$ preferred points P(1) of the first detection layer are obtained based on the SE enumeration rule. Corresponding to the first detection layer, the equation $y_T = r_{TT} x_T$ is solved to obtain the first zero-forcing soft-output solution $y_T/r_{TT}$ of $x_T$, and the first zero-forcing soft-output solution $y_T/r_{TT}$ of $x_T$ could be represented by floating-point numbers for its real part and imaginary part, such as the point Z(1.4, 2.3) in FIG. 3. In the following steps, $K_1$ constellation points near the point Z are obtained to be $K_1$ preferred points.

The above SE enumeration rule subsequently enumerates integers near a target value in an ascending order according to a one-dimensional distance (a distance along the real-part axis or the imaginary-part axis) from the target value. Example is made by taking the real part of Z point, i.e., 1.4, for illustration. Based on the SE enumeration rule, the sequentially enumerated are real parts 1, 3, −1, 5, −3, 7, −5, . . . , which are integers and have near to far distances from the target value along the real-part axis. Because the SE enumeration rule can be implemented with simple algorithm, the system computational complexity can be reduced efficiently. In the coordinates of FIG. 3, the real-part axis and the imaginary-part axis represent amplitudes of two orthogonal carriers modulated by the quadrature amplitude modulation (QAM) of the MIMO system.

The step S220 substantially enumerates multiple constellation points of the first detection layer based on the SE enumeration rule and defines a first sub-set of the first detection layer. A candidate range of the constellation points of the first sub-set is determined by a real-part candidate range M1 and an imaginary-part candidate range M2. In the step S220, $M_1$ real-part candidate values and $M_2$ imaginary-part candidate values according to the first zero-forcing soft-output solution of $x_T$ are obtained based on the SE enumeration rule. $M_1$ and $M_2$ are both positive integers and less than or equal $\sqrt{M}$, and the product of $M_1$ and $M_2$ is larger than or equal to $K_1$. Then, let the values of the first constellation points corresponding to the M1 real-part candidate values and M2 imaginary-part candidate values to be $x_T$ for respectively substituting for $r_{TT} x_T$, and the obtained results are defined to be $y'_T$. As a result, the PED corresponding to each first constellation point is a square root of the corresponding $(y'_T - y_T)^2$. The $K_1$ preferred points P(1) of the first detection layer can be obtained from the first constellation points, wherein any of the PEDs corresponding to the $K_1$ preferred points P(1) is less than the PED corresponding to any of other first constellation points. Therefore, the $K_1$ preferred points P(1) of the first detection layer can be obtained without having to substantially calculate the PEDs up to M times, thereby reducing the system complexity.

Then, in step S230, $K_{(n-1)}$ $n^{th}$ zero-forcing soft-output solutions of $x_{T-n+1}$ corresponding to the $n^{th}$ detection layer are obtained according to $K_{(n-1)}$ preferred points P(n−1) of the $(n-1)^{th}$ detection layer, multiple $n^{th}$ constellation points corresponding to $K_{(n-1)}$ $n^{th}$ zero-forcing soft-output solutions are selected based on the SE enumeration rule, and $K_n$ preferred points P(n) of the $n^{th}$ detection layer are obtained according to the PEDs corresponding to the $n^{th}$ constellation points, wherein n is a positive integer from 2 to (T−1).

The step S230 substantially enumerates multiple constellation points of the $n^{th}$ detection layer by using the SE enumeration rule and defines multiple $n^{th}$ sub-sets of the $n^{th}$ detection layer. In the step S230, when n is 2, the equation $y_{T-1} = r_{(T-1)T} x_T + r_{(T-1)(T-1)} x_{T-1}$ is solved to obtain the $K_1$ second zero-forcing soft-output solutions of $x_{T-1}$ corresponding to the second detection layer according to the $K_1$ preferred points P(1), and $M_1$ real-part candidate values and $M_2$ imaginary-part candidate values corresponding to each of the $K_1$ second zero-forcing soft-output solutions of $x_{T-1}$ are obtained based on the SE enumeration rule. Each second zero-forcing soft-output solution corresponds to one $M_1$ value and one $M_2$ value. The $M_1$ values and $M_2$ values corresponding to the second zero-forcing soft-output solutions can be the same or different. $K_1$ second sub-sets corresponding to the $K_1$ second zero-forcing soft-output solutions of can be respectively obtained from the constellation points corresponding to the real-part candidate values and imaginary-part candidate values. K second constellation points are selected from each of the $K_1$ second sub-sets, wherein the value of K corresponding to each second sub-set may be the same or different. Due to the advantage of using the SE enumeration rule, the values of K corresponding to the $K_1$ second sub-sets can be enumerated in a descending order.

Afterwards, the values of the second constellation points are set to be $x_{T-1}$, the second constellation point and the corresponding preferred points P(1) are substituted into $r_{(T-1)T} x_T + r_{(T-1)(T-1)} x_{T-1}$, and the obtained results are defined to be $y'_{T-1}$. Therefore, the PED corresponding to each second constellation point corresponds to a square root of the corresponding $(y'_T - y_T)^2 + (y'_{T-1} - y_{T-1})^2$. $K_2$ preferred points P(2) of the second detection layer are obtained from the second constellation points and transferred to the third detection layer. Any of the PEDs corresponding to the $K_2$ preferred points P(2) is less than the PED corresponding to any of the other second constellation points.

If n is less than or equal to (T−2), the value of n is added by 1. Consequently, $y_{T-n+1} = r_{(T-n+1)T} x_T + \ldots + r_{(T-n+1)(T-n+1)} x_{T-n+1}$ is solved to obtain $K_{(n-1)}$ $n^{th}$ zero-forcing soft-output solutions of $x_{T-n+1}$ according to $K_{(n-1)}$ preferred points P(n−1) of the $(n-1)^{th}$ detection layer and the $n^{th}$ zero-forcing soft-output solutions of each $x_{T-n+1}$ correspond to an $n^{th}$ sub-set based on the SE enumeration rule. That is, the $n^{th}$ zero-forcing soft-output solutions of each $x_{T-n+1}$ correspond to $M_1$ real-part candidate values and $M_2$ imaginary-part candidate values. Each $n^{th}$ zero-forcing soft-output solution corresponds to one value of $M_1$ and one value of $M_2$. Corresponding to each $n^{th}$ zero-forcing soft-output solution of $x_{T-n+1}$, K, $M_1$ and $M_2$ may be different. In practice, at least one of K, $M_1$ and $M_2$ is determined by the characteristic of the MIMO channel matrix. Preferably, the $K_{(n-1)}n^{th}$ sub-sets corresponding to $K_{(n-1)}$ $n^{th}$ zero-forcing soft-output solutions of $x_{T-n+1}$ of the $n^{th}$ detection layer correspond to different values of K according to the corresponding PEDs.

$K_n$, preferred points P(n) of the $n^{th}$ detection layer are obtained from multiple constellation points corresponding to the real-part candidate values and imaginary-part candidate values, wherein the PED corresponding to each $n^{th}$ constellation points is a square root of the corresponding $(y'_T-y_T)^2 + (y'_{T-1}-y_{T-1})^2 + \ldots + (y'_{T-n+1}-y_{T-n+1})^2$. Any of the PEDs corresponding to the $K_n$ preferred points P(n) is less than the PED corresponding to any of the other $n^{th}$ constellation points. Therefore, the $K_n$ preferred points P(n) of the $n^{th}$ detection layer can be obtained without having to substantially calculate the PEDs up to K×M times, thereby reducing the system complexity.

Next, in step S240, the equation $y_1 = r_{1T}x_T + \ldots + r_{11}x_1$ is solved to obtain $K_{(T-1)}$ $T^{th}$ zero-forcing soft-output solutions of $x_1$ corresponding to the $T^{th}$ detection layer according to $K_{(T-1)}$ preferred points P(T-1) of the $(T-1)^{th}$ detection layer, $K_T$ preferred points P(T) of the $T^{th}$ detection layer are obtained based on the SE enumeration rule, and the optimal solution, i.e. the optimal solution to the matrix x, corresponding to the T signals is obtained according to one of the $K_T$ preferred points P(T) corresponding to the least PED. The PED corresponding to each of the KT preferred points P(T) is a square root of the corresponding $(y'_T-y_T)^2 + (y'_{T-1}-y_{T-1})^2 + \ldots + (y'_1-y_1)^2$. Consequently, the $K_T$ preferred points P(T) of the $T^{th}$ detection layer can be obtained without having to substantially calculate the PEDs up to M times, thereby decreasing the system complexity.

Figure 4:
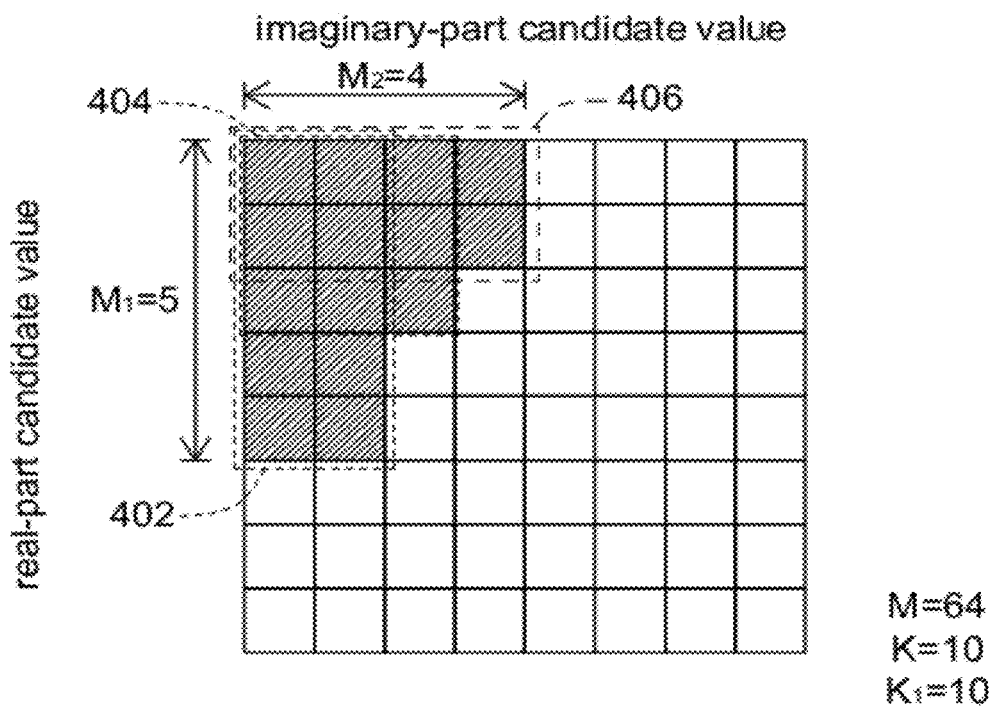
FIG. 4 shows a schematic illustration of one example of the real-part candidate values and imaginary-part candidate values corresponding to the first detection layer according to the first embodiment of the invention.

Illustration will be made without any limitative purpose according to the example, in which M equals to 64 and each $K_1$ to $K_T$ equals to 10. In the embodiment, the 10 preferred points P(1) of the first detection layer can be obtained by many methods. A weight enumeration rule and a geometric enumeration rule are taken for example. FIG. 4 shows a schematic illustration of one example of the real-part candidate values and imaginary-part candidate values corresponding to the first detection layer according to the first embodiment of the invention. Referring to FIG. 4, illustration is made without any limitative purpose according to the example, in which $M_1$ equals to 5, $M_2$ equals to 4, and K equals to 10. In FIG. 4, 5 real candidates and 4 imaginary candidates for the first zero-forcing soft-output solution of $x_T$ can be obtained based on the SE enumeration rule. Then, the 10 preferred points P(1) of the first detection layer are obtained from the first constellation points corresponding to the 5 real-part candidate values and 4 imaginary-part candidate values by the weight enumeration rule. When the first zero-forcing soft-output solution of $x_T$ is the point Z(1.4, 2.3) of FIG. 2, the 5 real-part candidate values are respectively 5 real-part values, such as 1, 3, −1, 5 and −3, closest to the real-part value 1.4 of the point Z along the real axis. The 4 imaginary-part candidate values are respectively 4 imaginary-part values, such as 3, 1, 5 and −1, closest to the imaginary-part value 2.3 of the point Z along the imaginary axis.

In terms of the weight enumeration rule, the 10 preferred points P(1) corresponding to the first zero-forcing soft-output solution of $x_T$ are included in the first constellation points corresponding to the $N_1^{th}$ real-part candidate value and the $N_2^{th}$ imaginary-part candidate value. That is, for a union set $\{1 \leq N_1 \leq M_1, 1 \leq N_2 \leq M_2\}$, if $N_1N_2 \leq K$ is satisfied, the $K_1$ preferred points are included in the first sub-set formed by the union set $\{N_1, N_2\}$, wherein $N_1$ and $N_2$ are both positive integers. In FIG. 4, the union set $\{N_1, N_2\}$ is the shadow area, and the 10 preferred points P(1) are included in the 15 first constellation points in the shadow area. Any of the PEDs corresponding to the 10 preferred points P(1) is less than the PED corresponding to any of the other first constellation points.

For example, the first constellation points included in the area 402 of FIG. 4 are a collection of those having a multiplication of $N_1$ and $N_2$ less than or equal to 5×2 (=10). The first constellation points included in the area 404 are a collection of those having a multiplication of $N_1$ and $N_2$ less than or equal to 3×3 (=9). The first constellation points included in the area 406 are a collection of those having a multiplication of $N_1$ and $N_2$ less than or equal to 2×4 (=8). The shadow area corresponds to a union of the areas 402, 404 and 406 and is the first sub-set.

Figure 5:
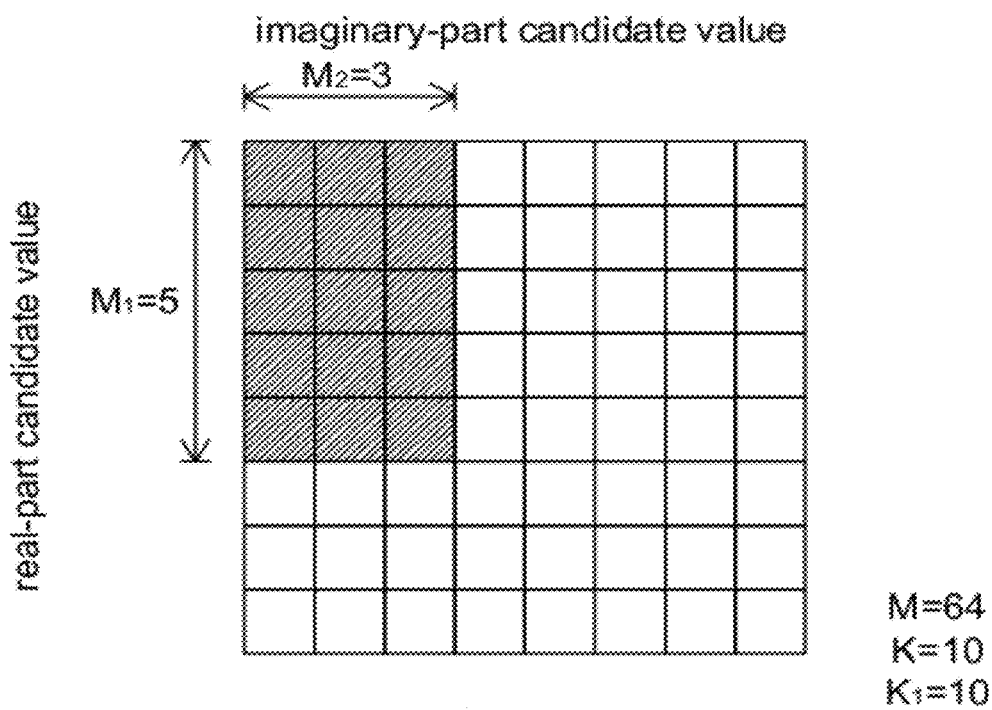
FIG. 5 shows a schematic illustration of another example of the real-part candidate values and imaginary-part candidate values corresponding to the first detection layer according to the first embodiment of the invention.

Besides, the 10 preferred points P(1) of the first detection layer can also be obtained from multiple constellation points near the first zero-forcing soft-output solution of $x_T$ by the geometric enumeration rule. FIG. 5 shows a schematic illustration of another example of the real-part candidate values and imaginary-part candidate values corresponding to the first detection layer according to the first embodiment of the invention. Referring to FIG. 5, $M_1$, $M_2$ and K are respectively exemplified to be 5, 3 and 10 for illustration, but are not limited thereto. In FIG. 5, the 10 preferred points P(1) of the first detection layer are obtained from the 15 first constellation points corresponding to 5 real-part candidate values and 3 imaginary-part candidate values by using the geometric enumeration rule. That is, the 10 preferred points P(1) are included in the 15 first constellation points of the shadow area. Respectively let $x_T$, to be the 15 constellation points, solutions to $r_{TT}x_T$ are obtained and the obtained results are defined to be $y'_T$. Then, the 10 first constellation points with the least PEDs (square roots of $(y'_T-y_T)^2$) of the 15 first constellation points are selected to be the preferred points P(1). The 10 preferred points P(1) of the first detection layer are supposed to be A1, B1, . . . , and J1.

Figure 6:
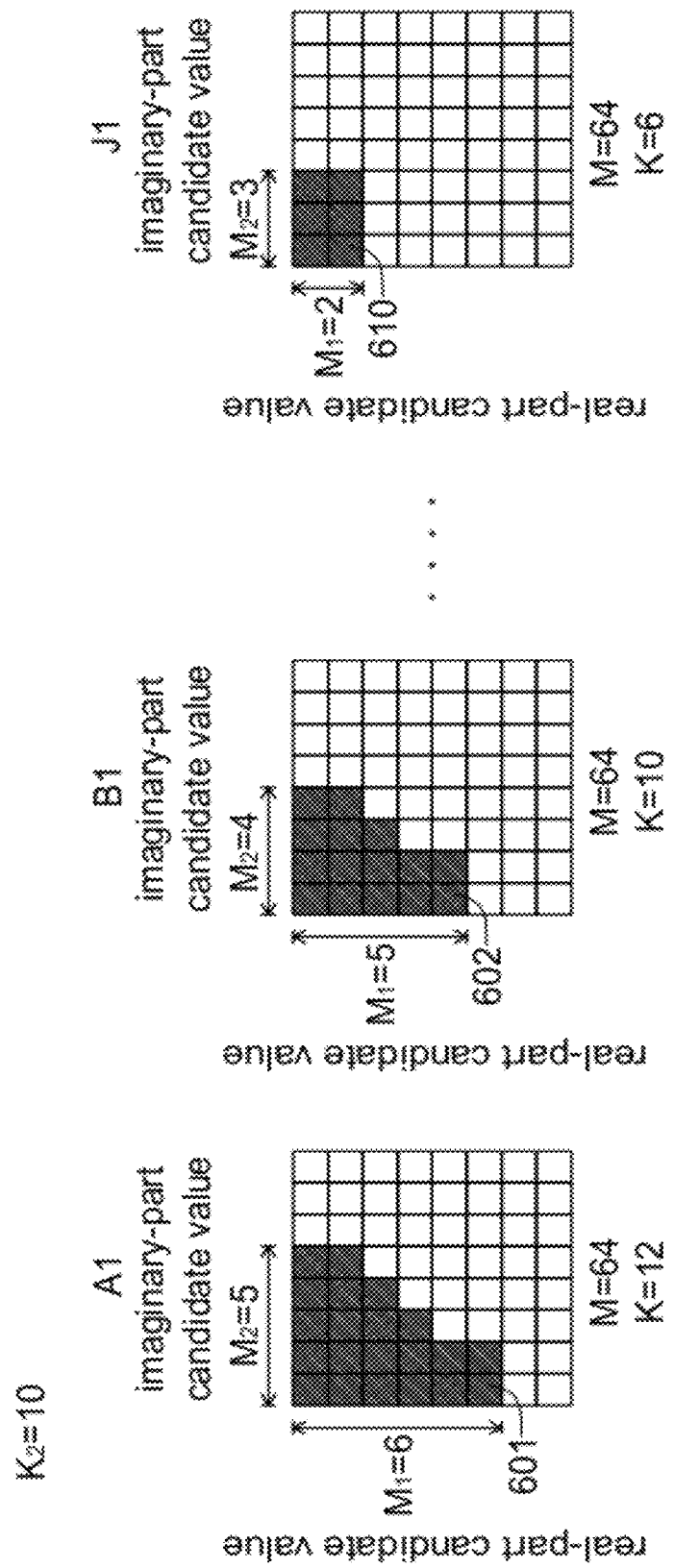
FIG. 6 shows a schematic illustration of one example of real-part candidate values and imaginary-part candidate values corresponding to the second detection layer according to the first embodiment of the invention.

The 10 preferred points P(1) are transferred to the second detection layer, and respectively correspond to 10 second sub-sets (shadow areas 601~610). FIG. 6 shows a schematic illustration of one example of the real-part candidate values and imaginary-part candidate values corresponding to the second detection layer according to the first embodiment of the invention. $K_2$ is exemplified to be 9 in FIG. 6, but not limited thereto. In FIG. 6, the 10 preferred points P(1) i.e. A1, B1, . . . , and J1, are received from the first detection layer. Respectively let $x_T$ to be A1, B1, . . . , and J1 to be substituted into $y_{T-1} = r_{(T-1)T}x_T + r_{(T-1)(T-1)}x_{T-1}$ to obtain 10 second zero-forcing soft-output solutions of $x_{T-1}$ of the second detection layer. Then, $M_1$ real-part candidate values and $M_2$ imaginary-part candidate values corresponding to each of the 10 second zero-forcing soft-output solutions of $x_{T-1}$ are obtained based on the SE enumeration rule.

In FIG. 6, after obtaining the second zero-forcing soft-output solutions of $x_{T-1}$ according to the preferred point A1 of the first detection layer, $M_1$=6 real-part candidate values and $M_2$=5 imaginary-part candidate values are obtained based on the SE enumeration rule for instance. Next, suppose K is equal to 12, for example, 21 second constellation points of the second sub-set (the shadow area 601) are obtained from the 6 real-part candidate values and 5 imaginary-part candidate values by using the weight enumeration rule. Afterwards, the PEDs of the 21 second constellation points are calculated and K=12 second constellation points having the least PEDs are selected. The 12 second constellation points are supposed to be A1_1, A1_2, ..., and A1_12. Take A1_1 as an example, the method of obtaining the PED of A1_1 is as following. First, $x_T$ is set to be A1 and $x_{T-1}$ is set to be A1_1 to substitute into $r_{(T-1)T}x_T + r_{(T-1)(T-1)}x_{T-1}$, and the obtained result is defined to be $y'_{T-1}$. Then, a square root of $(y'_T - y_T)^2 + (y'_{T-1} - y_{T-1})^2$, the PED of A1_1, is calculated by using the value $y'_T (= r_{TT} x_T)$ corresponding to $x_T = A1$.

Likewise, after obtaining the second zero-forcing soft-output solution of $x_{T-1}$ according to the preferred point B1 of the first detection layer, $M_1 = 5$ real-part candidate values and $M_2 = 4$ imaginary-part candidate values are obtained based on the SE enumeration rule. Suppose K is equal to 10, 10 preferred points corresponding to B1 can be obtained, such as B1_1, B1_2, ..., and B1_10. Likewise, after obtaining the second zero-forcing soft-output solution of $x_{T-1}$ according to the preferred point J1 of the first detection layer, $M_1 = 2$ real-part candidate values, $M_2 = 3$ imaginary-part candidate values are obtained based on the SE enumeration rule, and K=6 preferred points, such as J1_1, J1_2, ..., and J1_6 are obtained.

Following that, $K_2$ (=10) second constellation points having smaller PEDs are selected from the (12+10+ ... +6) second constellation points (i.e. A1_1 to A1_12, B1_1 to B1_10, ..., J1_1 to J1_6) to be $K_2$ (=10) preferred points P(2) of the second detection layer, and the 10 preferred points P(2) are respectively set as A2, B2, ..., and I2. Then, the 10 preferred points P(2) are transferred to the third detection layer. Any of the PEDs corresponding to the 10 preferred points P(2) is less than the PED corresponding to any of the other second constellation points.

When n is less than or equal to (T−2), the value of n is added by 1. Consequently, corresponding to the $n^{th}$ detection layer, 10 preferred points P(n−1) of the $(n−1)^{th}$ detection layer, i.e. A(n−1), B(n−1), ..., J(n−1) are received and 10 $n^{th}$ zero-forcing soft-output solutions of $x_{T-n+1}$ corresponding to the $n^{th}$ detection layer are obtained. Multiple $n^{th}$ constellation points corresponding to the 10 $n^{th}$ zero-forcing soft-output solutions are selected based on the SE enumeration rule, and the 10 preferred points P(n) of the $n^{th}$ detection layer are obtained according to the PEDs corresponding to the $n^{th}$ constellation points. The 10 preferred points P(T−1) of the $(T−1)^{th}$ detection layer are transferred to the $T^{th}$ detection layer.

Figure 7:
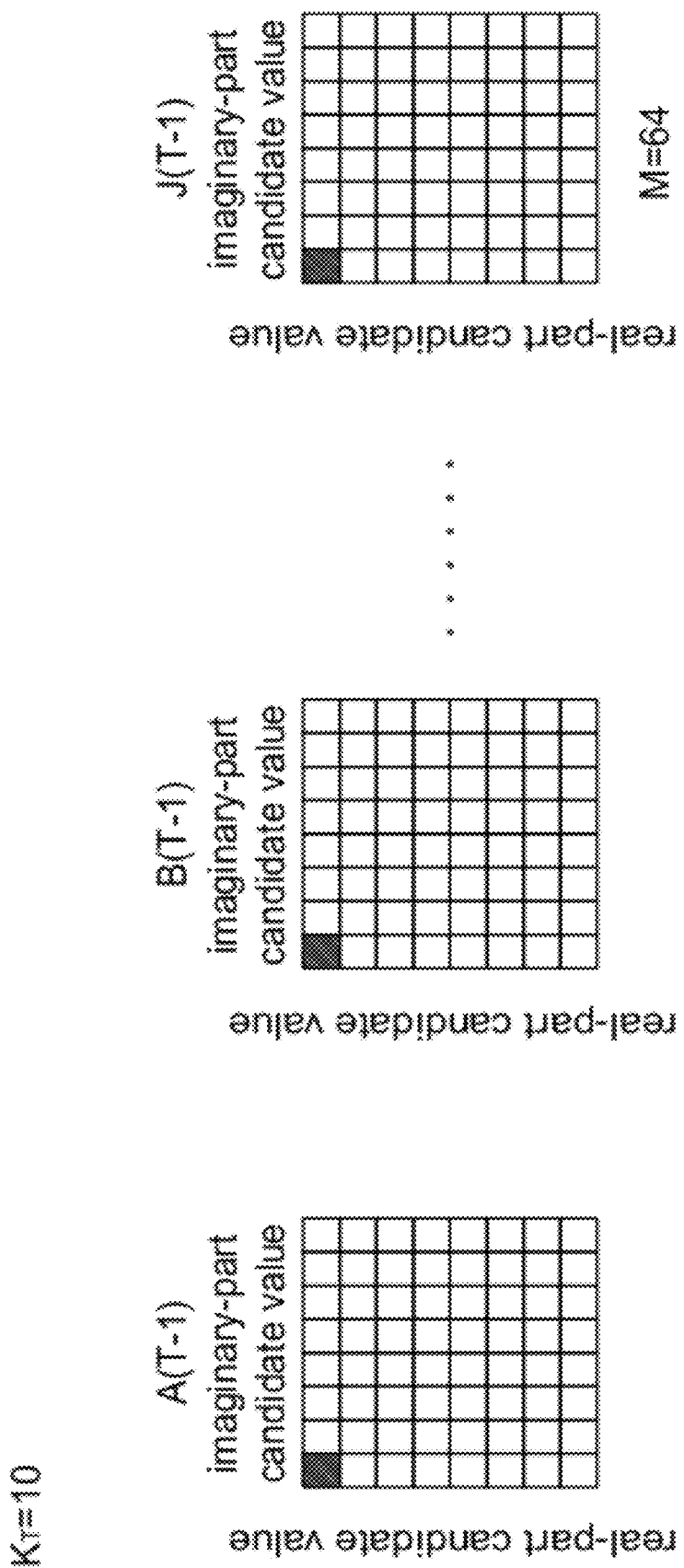
FIG. 7 shows a schematic illustration of one example of the real-part candidate values and imaginary-part candidate values corresponding to the $T^{th}$ detection layer according to the first embodiment of the invention.

FIG. 7 shows a schematic illustration of one example of the real-part candidate values and imaginary-part candidate values corresponding to the $T^{th}$ detection layer according to the first embodiment of the invention. Referring to FIG. 7, the 10 preferred points P(T−1) of the $(T−1)^{th}$ detection layer are received and substituted into $y_1 = r_{1T} x_T + ... r_{11} x_1$ to obtain 10 $T^{th}$ zero-forcing soft-output solution of $x_1$ corresponding to the $T^{th}$ detection layer. As shown by the shadow area of FIG. 7, 1 real-part candidate value and 1 imaginary-part candidate value corresponding to each of the 10 $T^{th}$ zero-forcing soft-output solution of $x_1$ are obtained based on the SE enumeration rule. The real-part candidate values and imaginary-part candidate values correspond to 10 $T^{th}$ constellation points, which are 10 preferred points P(T) of the $T^{th}$ detection layer. The preferred point of the 10 preferred points P(T) corresponding to the least PED is the optimal solution corresponding to the T signals.

In the sphere decoding method applied to a MIMO channel disclosed in the first embodiment of the invention, an optimal solution of T signals can be obtained by merely calculating the PEDs of a portion of constellation points based on the SE enumeration rule in the complex domain, without having to calculate the PEDs of all the constellation points, thereby greatly reducing detection complexity of the sphere decoding method and the calculation time. Therefore, the values of the T signals outputted by T transmission antennas of a transmitting end can be quickly solved according to the R reception signals received by R reception antennas of a receiving end. Therefore, the receiving end using the sphere decoding method applied to a MIMO channel of the embodiment can have advantages of high-performance signal transmission and decoding and reducing system hardware complexity and chip area. Besides, the system can determine the values of $M_1$, $M_2$, K and $K_n$ based on the characteristic of the MIMO channel, such that the system has the lowest packet error rate or bit error rate to maintain a brilliant signal receiving performance of the system.

Embodiment Two

The sphere decoding method applied to a MIMO channel of this embodiment is applied in the real domain, and includes the following steps of; a. receiving T signals transmitted via the MIMO channel, wherein T is a positive integer, and the MIMO channel is characterized by a channel matrix; b. expanding the channel matrix in a real form and generating a corresponding triangle matrix, wherein the triangle matrix corresponds to a first detection layer to a $2T^{th}$ detection layer, each detection layers includes $\sqrt{M}$ constellation points, and $\sqrt{M}$ is a positive integer; c. obtaining a first zero-forcing soft-output solution corresponding to the first detection layer, and obtaining $K_1$ preferred points P(1) of the first detection layer based on the SE enumeration rule, wherein $K_1$ is a positive integer less than or equal to $\sqrt{M}$; d. obtaining $K_1$ second zero-forcing soft-output solutions corresponding to a second detection layer according to $K_1$ preferred points P(1) of the first detection layer, selecting multiple second constellation points corresponding to the $K_1$ second zero-forcing soft-output solutions based on the SE enumeration rule, and obtaining $K_2$ preferred points P(2) of the second detection layer according to PEDs corresponding to the second constellation points; e. obtaining $K_{(n-1)}$ $n^{th}$ zero-forcing soft-output solutions corresponding to an $n^{th}$ detection layer according to $K_{(n-1)}$ preferred points P(n−1) of the $(n−1)^{th}$ detection layer selecting multiple $n^{th}$ constellation points corresponding to the $K_{(n-1)}$ $n^{th}$ zero-forcing soft-output solutions based on the SE enumeration rule, and obtaining $K_n$ preferred points P(n) of the $n^{th}$ detection layer according to the PEDs corresponding to the $n^{th}$ constellation points, wherein n is a positive integer from 3 to (2T−1); and f. obtaining $K_{(2T-1)}$ $2T^{th}$ zero-forcing soft-output solutions corresponding to a $2T^{th}$ detection layer according to $K_{(2T-1)}$ preferred points P(2T−1) of the $(2T-1)^{th}$ detection layer, obtaining $K_{2T}$ preferred points P(2T) of the $2T^{th}$ detection layer based on the SE enumeration rule, and obtaining an optimal solution corresponding to the T signals according to one of the $K_{2T}$ preferred points P(2T) corresponding to the least PED. $K_1$ to $K_{2T}$ are positive integers, and $K_1$ to $K_{2T}$ can be, for example, but non-limitedly, the same or different.

Figure 8:
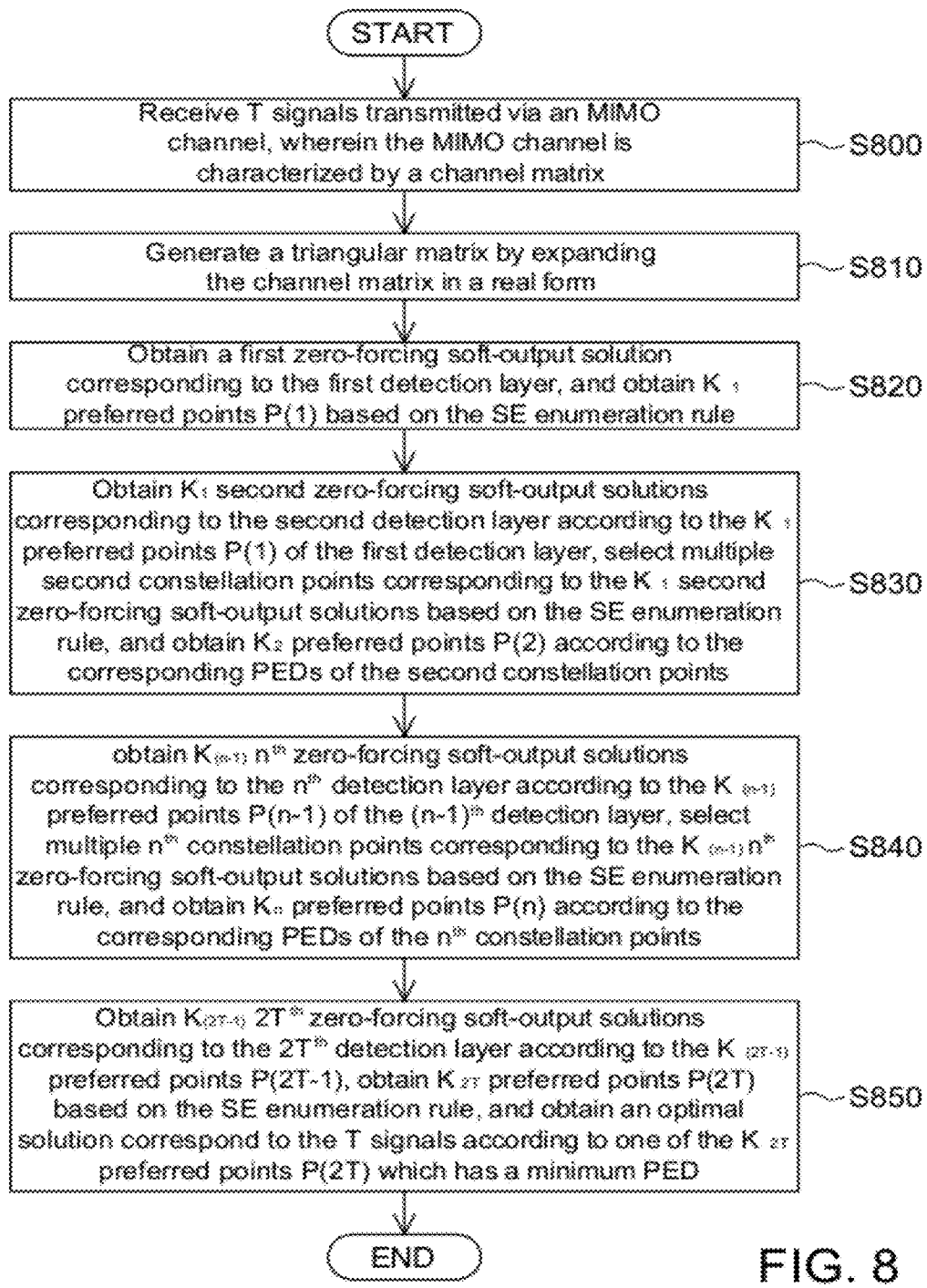
FIG. 8 is a flowchart of a sphere decoding method applied to a MIMO channel according to a second embodiment of the invention.

Further detailed description is provided below. FIG. 8 is a flow chart of a sphere decoding method applied to a MIMO channel according to a second embodiment of the invention. Referring to FIG. 8, first, in step S800, T signals transmitted via a MIMO channel are received. The MIMO channel is characterized by a channel matrix. Preferably, R' reception antennas are used to receive T signals transmitted by T transmitter antennas via the MIMO channel, wherein R' is a positive integer. The channel matrix is an R'×T channel matrix H. The MIMO system represented in the time domain or the frequency domain can be defined as the equality formula (1):

$$r = Hx + n$$

wherein the R'×1 matrix r represents the signals received by the R' reception antennas, the T×1 matrix x represents the signals transmitted by the T transmission antennas, and the R'×1 matrix n represents noise.

Next, in step S810, the channel matrix H is expanded in a real form and a Q-R decomposition is performed on the channel matrix H expanded in the real form to generate a triangular matrix, wherein the triangular matrix corresponds to a first detection layer to a $2T^{th}$ detection layer. Preferably, the first detection layer to the $2T^{th}$ detection layer respectively correspond to rows of the triangular matrix having the most "0" elements, the secondly most "0" elements, . . . , the least "0" elements. In the step S810, the equality formula (1) of the MIMO system can be substantially transferred as following:

$$r_R = H_R x_R + n_R \quad (4)$$

wherein $$r_R = \begin{vmatrix} \text{Re}(r) \\ \text{Im}(r) \end{vmatrix},$$

$$x_R = \begin{vmatrix} \text{Re}(x) \\ \text{Im}(x) \end{vmatrix},$$

$$n_R = \begin{vmatrix} \text{Re}(n) \\ \text{Im}(n) \end{vmatrix},$$

and $$H_R = \begin{bmatrix} \text{Re}(H) & -\text{Im}(H) \\ \text{Im}(H) & \text{Re}(H) \end{bmatrix}$$

Besides, by performing the above Q-R decomposition, it can be obtained:

$$H_R = Q_R R_R$$

wherein $Q_R$ is a 2R'×2T matrix and $R_R$ is a 2T×2T triangular matrix. The triangular matrix $R_R$ is an upper triangular matrix for instance, but is not limited thereto. After the step S810, according to the equality formula (4), another equality formula of the MIMO system can be obtained as following:

$$y_R = Q_R^T r_R = R_R x_R + Q^T n_R \quad (5)$$

wherein the matrix product of $Q^T$ and Q is an unit matrix I. If the noise item $Q^T n_R$ in the equality formula (5) is omitted, and the triangular matrix $R_R$ is an upper triangular matrix, the equality formula (5) can be expanded in a matrix form as followings:

$$\begin{bmatrix} \tilde{y}_1 \\ \tilde{y}_2 \\ \tilde{y}_3 \\ \vdots \\ \widetilde{y_{2T}} \end{bmatrix} = \begin{bmatrix} \tilde{r}_{11} & \tilde{r}_{12} & \tilde{r}_{13} & \cdots & \widetilde{r_{(2T)}} \\ 0 & \tilde{r}_{22} & \tilde{r}_{23} & \ddots & \widetilde{r_{(2T)}} \\ 0 & 0 & \tilde{r}_{33} & \ddots & \widetilde{r_{(2T)}} \\ \vdots & \vdots & \ddots & \ddots & \vdots \\ 0 & 0 & 0 & 0 & \widetilde{r_{(2T)(2T)}} \end{bmatrix} \begin{bmatrix} \tilde{x}_1 \\ \tilde{x}_2 \\ \tilde{x}_3 \\ \vdots \\ \widetilde{x_{2T}} \end{bmatrix} \quad (6)$$

wherein $\tilde{y}_p$ and $\widetilde{r_{pq}}$ given, p is a positive integer from 1 to 2T, and q is a positive integer from 1 to 2T. This embodiment finds the optimal solution of $\tilde{x}_1$ to $\widetilde{x_{2T}}$ by using the values of given $\tilde{y}_p$ and $\widetilde{r_{pq}}$.

In the equality formula (6), the equation $\widetilde{y_{2T}} = \widetilde{r_{(2T)(2T)}} \widetilde{x_{2T}}$ corresponding to $\widetilde{x_{2T}}$ is defined as the first detection layer, the equation $\widetilde{y_{2T-1}} = \widetilde{r_{(2T-1)(2T)}} \widetilde{x_{2T}} + \widetilde{r_{(2T-1)(2T-1)}} \widetilde{x_{2T-1}}$ corresponding to $\widetilde{x_{2T-1}}$ is defined as the second detection layer, the equations corresponding to $\widetilde{x_{2T-2}}$, . . . , $\tilde{x}_2$ are subsequently defined as the third to the (2T−1)-th detection layers, the equation $\tilde{y}_1 = \widetilde{r_{(2T)}} \widetilde{x_{2T}} + \ldots + \tilde{r}_{11} \tilde{x}_1$ corresponding to $\tilde{x}_1$ is defined as the $2T^{th}$ detection layer, wherein each detection layer includes $\sqrt{M}$ constellation points and $\sqrt{M}$ is a positive integer. The K-Best sphere decoding method generates $K_n$ preferred points corresponding to the $n^{th}$ detection layer, and $K_n$ is less $\sqrt{M}$.

Then, in step S820, a first zero-forcing soft-output solution corresponding to the value $\widetilde{x_{2T}}$ of the first detection layer is obtained and $K_1$ preferred points P(1) of the first detection layer are obtained based on the SE enumeration rule, wherein $K_1$ is a positive integer and less than or equal to $\sqrt{M}$. Corresponding to the first detection layer, the equation $\widetilde{y_{2T}} = \widetilde{r_{(2T)(2T)}} \widetilde{x_{2T}}$ is solved to obtain the first zero-forcing soft-output solution $\widetilde{y_{2T}} / \widetilde{r_{(2T)(2T)}}$ of $\widetilde{x_{2T}}$, and the first zero-forcing soft-output solution of $\widetilde{x_{2T}}$ could be represented by floating-point numbers for its real part and imaginary part. The above SE enumeration rule enumerates $K_1$ integers near the first zero-forcing soft-output solution of $\widetilde{x_{2T}}$ in an ascending order according to a one-dimensional distance from the first zero-forcing soft-output solution of $\widetilde{x_{2T}}$. The $K_1$ integers are $K_1$ preferred points P(1). Any of the PEDs corresponding to the $K_1$ preferred points P(1) is less than the PED corresponding to any of the other first constellation points. The $K_1$ preferred points P(1) of the first detection layer can be obtained without having to calculate the PEDs, thereby reducing the system complexity.

Then, in step S830, $K_1$ second zero-forcing soft-output solutions of $\widetilde{x_{2T-1}}$ corresponding to the second detection layer are obtained according to the $K_1$ preferred points P(1) of the first detection layer, multiple second sub-set corresponding to the $K_1$ second zero-forcing soft-output solutions are defined based on the SE enumeration rule. K second constellation points are selected from each of the $K_1$ second sub-set, wherein the values of K corresponding to the second sub-sets may be the same or different. Then, $K_2$ preferred points P(2) of the second detection layer are obtained according to the PEDs corresponding to the second constellation points.

In the step S830, $\widetilde{y_{2T-1}} = \widetilde{r_{(2T-1)(2T)}} \widetilde{x_{2T}} + \widetilde{r_{(2T-1)(2T-1)}} \widetilde{x_{2T-1}}$ is solved to obtain the $K_1$ second zero-forcing soft-output solutions of $\widetilde{x_{2T-1}}$ corresponding to the second detection layer according to the $K_1$ preferred points P(1) of the first detection layer, and K second constellation points for each of the $K_1$ second zero-forcing soft-output solutions of $\widetilde{x_{2T-1}}$ are obtained based on the SE enumeration rule.

Then, the second constellation points are set to be $\widetilde{x_{2T-1}}$, the second constellation points and the corresponding preferred points P(1) are substituted into $\widetilde{r_{(2T-1)(2T)}} \widetilde{x_{2T}} + \widetilde{r_{(2T-1)(2T-1)}} \widetilde{x_{2T-1}}$, and the obtained results are defined to be $\tilde{y}'_{2T-1}$. Therefore, the PED corresponding to each second constellation point corresponds to a square root of the corresponding $(\tilde{y}'_{2T} - \tilde{y}_{2T})^2 (\tilde{y}'_{2T-1} - \tilde{y}_{2T-1})^2$. $K_2$ preferred points P(2) of the second detection layer are obtained from the second constellation points and transferred to the third detection layer. Any of the PEDs corresponding to the $K_2$ preferred points P(2) is less than the PED corresponding to any of the other second constellation points.

Following that, in step S840, $K_{(n-1)}$ $n^{th}$ zero-forcing soft-output solutions of $\widetilde{x_{2T-n+1}}$ corresponding to the $n^{th}$ detection layer are obtained according to $K_{(n-1)}$ preferred points P(n−1)

of the $(n-1)^{th}$ detection layer, multiple $n^{th}$ constellation points corresponding to $K_{(n-1)}$ $n^{th}$ zero-forcing soft-output solutions are selected based on the SE enumeration rule, and $K_n$ preferred points $P(n)$ of the $n^{th}$ detection layer are obtained according to the PEDs corresponding to the $n^{th}$ constellation points, wherein n is a positive integer from 3 to $(2T-1)$.

The step S840 substantially enumerates multiple constellation points of the $n^{th}$ detection layer based on the SE enumeration rule and defines multiple $n^{th}$ sub-sets of the $n^{th}$ detection layer. In the step S840, when n is 3, first, the $K_2$ preferred points $P(2)$ are enumerated in an order from small to large. The equation $\widetilde{y_{2T-2}} = \widetilde{r_{(2T-2)(2T)}x_{2T}} + \widetilde{r_{(2T-2)(2T-1)}x_{2T-1}} + \widetilde{r_{(2T-2)(2T-2)}x_{2T-2}}$ is solved to obtain the $K_2$ third zero-forcing soft-output solutions of $\widetilde{x_{2T-2}}$ corresponding to the third detection layer according to the enumerated $K_2$ preferred points $P(2)$ of the second detection layer, and $K_2$ third sub-sets for the $K_2$ third zero-forcing soft-output solutions of $\widetilde{x_{2T-2}}$ are based on the SE enumeration rule. Each of the third sub-sets includes $M_i$ third constellation points, and $M_i$ is less than or equal to $\sqrt{M}$.

Afterwards, the values of the third constellation points are set to be $\widetilde{x_{2T-2}}$ and substituted into $\widetilde{r_{(2T-2)(2T)}x_{2T}} + \widetilde{r_{(2T-2)(2T-1)}x_{2T-1}} + \widetilde{r_{(2T-2)(2T-2)}x_{2T-2}}$, and the obtained results are define to be $\widetilde{y'_{2T-2}}$. Therefore, the PED corresponding to each third constellation point corresponds to a square root of the corresponding $(\widetilde{y'_{2T}} - \widetilde{y_{2T}})^2 + (\widetilde{y'_{2T-1}} - \widetilde{y_{2T-1}})^2 + (\widetilde{y'_{2T-2}} - \widetilde{y_{2T-2}})^2$. $K_3$ preferred points $P(3)$ of the third detection layer are obtained from the third constellation points and transferred to the fourth detection layer. Any of the PEDs corresponding to the $K_3$ preferred points $P(3)$ is less than the PED corresponding to any of the other third constellation points.

When n is less than or equal to $(2T-2)$, the value of n is added by 1. Consequently, $\widetilde{y_{2T-n+1}} = \widetilde{r_{(2T-n+1)(2T)}x_{2T}} + \ldots + \widetilde{r_{(2T-n+1)(2T-n+1)}x_{2T-n+1}}$ is solved to obtain $K_{(n-1)}$ $n^{th}$ zero-forcing soft-output solutions of $\widetilde{x_{2T-n+1}}$ corresponding to the $n^{th}$ detection layer according to $K_{(n-1)}$ preferred points $P(n-1)$ of the $(n-1)^{th}$ detection layer, and the $n^{th}$ zero-forcing soft-output solutions of each $\widetilde{x_{2T-n+1}}$ correspond to an $n^{th}$ sub-set based on the SE enumeration rule. That is, the $n^{th}$ zero-forcing soft-output solutions of each $\widetilde{x_{2T-n+1}}$ correspond to $M_i$ $n^{th}$ constellation points respectively. The $K_n$ preferred points $P(n)$ of the $n^{th}$ detection layer are obtained from the $n^{th}$ constellation points. The PED corresponding to each $n^{th}$ constellation point is a square root of the corresponding $(\widetilde{y'_{2T}} - \widetilde{y_{2T}})^2 + (\widetilde{y'_{2T-1}} - \widetilde{y_{2T-1}})^2 + \ldots + (\widetilde{y'_{2T-n+1}} - \widetilde{y_{2T-n+1}})^2$. Any of the PEDs corresponding to the $K_n$ preferred points $P(n)$ is less than the PED corresponding to any of the other $n^{th}$ constellation points. Therefore, the $K_n$ preferred points $P(n)$ of the $n^{th}$ detection layer can be obtained without having to calculate the PEDs up to $K \times M$ times, thereby reducing the system complexity.

Afterwards, in step S850, the equation $\tilde{y}_1 = \widetilde{r_{(2T)}x_{2T}} + \ldots + \tilde{r}_{11}\tilde{x}_1$ is solved to obtain $K_{(2T-1)}$ $2T^{th}$ zero-forcing soft-output solutions of x, corresponding to the $2T^{th}$ detection layer according to $K_{(2T-1)}$ preferred points $P(2T-1)$ of the $(2T-1)^{th}$ detection layer, $K_{2T}$ preferred points $P(2T)$ of the $2T^{th}$ detection layer are obtained based on the SE enumeration rule, and the optimal solution, i.e. the optimal solution to the matrix $x_R$, corresponding to the T signals is obtained according to one of the $K_{2T}$ preferred points $P(2T)$ corresponding to the least PED. The PED corresponding to each of the $K_{2T}$ preferred points $P(2T)$ is a square root of the corresponding $(\widetilde{y'_{2T}} - \widetilde{y_{2T}})^2 + (\widetilde{y'_{2T-1}} - \widetilde{y_{2T-1}})^2 + \ldots (\widetilde{y'_1} - \tilde{y}_1)^2$. Consequently, the $K_{2T}$ preferred points $P(2T)$ of the $2T^{th}$ detection layer can be obtained without having to substantially calculate the PEDs up to $\sqrt{M} \times K_{(2T-1)}$ times, thereby decreasing the system complexity.

In the following description, $M=64$, $K_1=5$ and $K_2$ to $K_{2T}=10$ are exemplified for illustration, but the invention is not limited thereto. Corresponding to the first zero-forcing soft-output solution of $\widetilde{x_{2T}}$, the $K_1=5$ preferred points $P(1)$ of the first detection layer are obtained based on the SE enumeration rule without having to calculate the PEDs, and the 5 preferred points $P(1)$ are transferred to the second detection layer. Any of the PED of the 5 preferred points $P(1)$ is less than the PED of any of the other constellation points.

Figure 9:
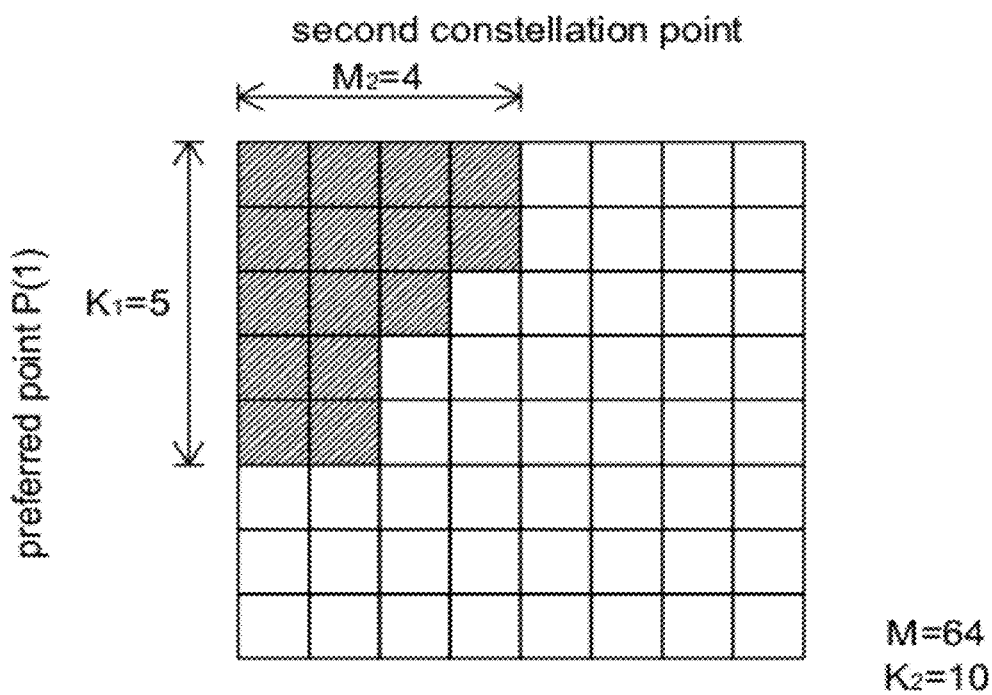
FIG. 9 shows a schematic illustration of one example of preferred points P(1) corresponding to the second detection layer and the second constellation points according to the second embodiment of the invention.

In the embodiment, the 10 preferred points $P(2)$ of the second detection layer can be obtained by many methods. A weight enumeration rule and a geometric enumeration rule are taken for example. FIG. 9 shows a schematic illustration of one example of preferred points $P(1)$ and the second constellation points corresponding to the second detection layer according to the second embodiment of the invention. Referring to FIG. 9, for the $K_1=5$ second zero-forcing soft-output solution of $\widetilde{x_{2T-1}}$, 5 second sub-sets are obtained along a single axis based on the SE enumeration rule, and $M_2$ second constellation points are obtained from each of the second sub-sets. The 10 preferred points $P(2)$ of the second detection layer are obtained from multiple second constellation points by the weight enumeration rule. Each of the second zero-forcing soft-output solutions correspond to one value of $M_2$, and the $M2$ values corresponding to the second zero-forcing soft-output solutions may be the same or different. In FIG. 9, the values of $M_2$ in the first to the fifth rows are exemplified to be respectively 4, 5, 3, 2 and 2 for illustration, but are not limited thereto.

Owing that $R_R$ is a real matrix, all elements in $R_R$ are real numbers. Therefore, the step of obtaining multiple constellation points along a single axis based on the SE enumeration rule implies obtaining the constellation points along one of the real axis and the imaginary axis based on the SE enumeration rule. In FIG. 9, each row of second constellation points corresponds to one preferred point $P(1)$ and the PEDs of the preferred points $P(1)$ corresponding to the rows from top to bottom are increasing progressively. That is, the second constellation points in the shadow area of the first row are the real-part or imaginary-part values of 4 second constellation points near the second zero-forcing soft-output solution obtained based on the preferred points $P(1)$ having the least PED. The second constellation points in the shadow area of the second row are the real-part or imaginary-part values of 4 second constellation points near the second zero-forcing soft-output solution obtained based on the preferred points $P(1)$ having the second smallest PED. The second constellation points in the shadow area of the other rows are obtained likewise.

In terms of the weight enumeration rule, the 10 preferred points $P(2)$ corresponding to the second zero-forcing soft-output solution of $\widetilde{x_{2T-1}}$, include the $N_2^{th}$ second constellation counted from left to right in the $N_1^{th}$ preferred point $P(1)$ counted from top to bottom. That is, for a union set $\{1 \leq N_1 \leq M_1, 1 \leq N_2 \leq M_2\}$, if $N_1 N_2 \leq K_n$ is satisfied, the $K_n$ preferred points are included in the second sub-set formed by the union set $\{N_1, N_2\}$, wherein $N_1$ and $N_2$ are both positive integers. In FIG. 9, the union set $\{N_1, N_2\}$ is the shadow area, and the 10 preferred points $P(2)$ are included in the 15 second constellation points in the shadow area. Any of the PEDs corresponding to the 10 preferred points $P(2)$ is less than the PED corresponding to any of the other second constellation points.

Figure 10:
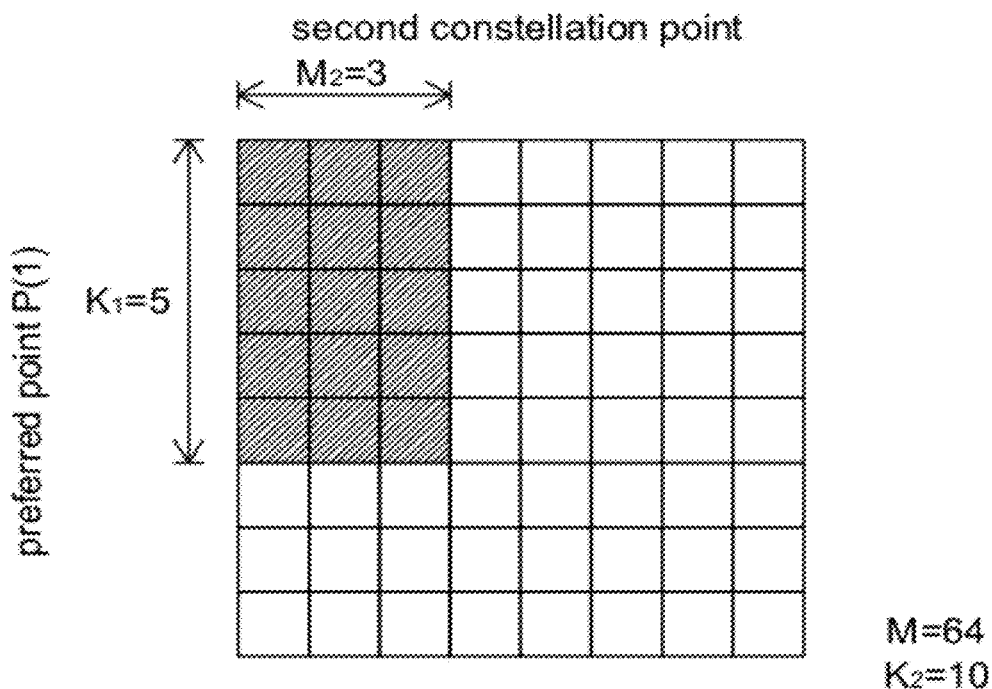
FIG. 10 shows a schematic illustration of another example of the preferred points P(1) corresponding to the second detection layer and second constellation points according to the second embodiment of the invention.

Besides, the 10 preferred points P(2) of the second detection layer can also be obtained from multiple constellation points near the second zero-forcing soft-output solution $\widetilde{x_{2T-1}}$, by the geometric enumeration rule. FIG. 10 shows a schematic illustration of another example of the preferred points P(1) and second constellation points corresponding to the second detection layer according to the second embodiment of the invention. Referring to FIG. 10, $M_2$ is exemplified to be 3 for illustration, but is not limited thereto. In FIG. 10, the 10 preferred points P(2) of the second detection layer are obtained from the 15 second constellation points of the shadow area by using the geometric enumeration rule. The 10 preferred points P(2) are transferred to the third detection layer.

Figure 11:
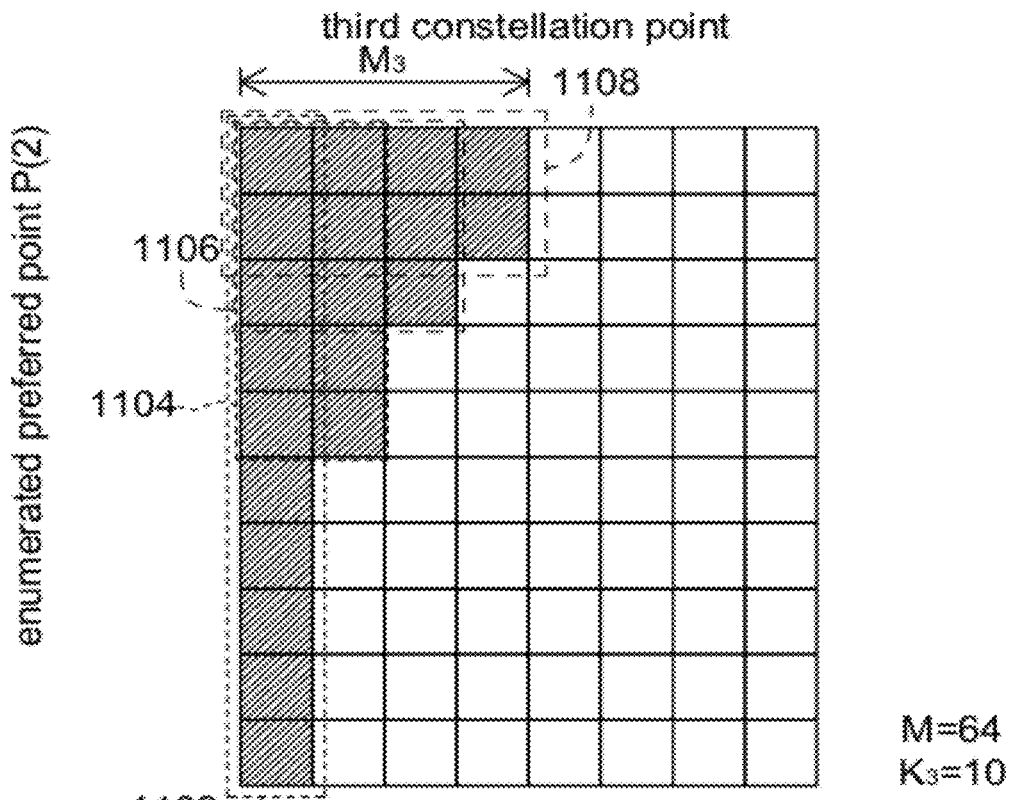
FIG. 11 shows a schematic illustration of one example of the enumerated preferred points P(2) corresponding to the third detection layer and the third constellation points according to the second embodiment of the invention.

FIG. 11 shows a schematic illustration of one example of the enumerated preferred points P(2) and the third constellation points corresponding to the third detection layer according to the second embodiment of the invention. Referring to FIG. 11, the 10 preferred points P(2) are received from the second detection layer and enumerated according to the corresponding PEDs. Then, the enumerated 10 preferred points P(2) are substituted into $\widetilde{y_{2T-2}} = \widetilde{r_{(2T-2)(2T)}}\widetilde{x_{2T}} + \widetilde{r_{(2T-2)(2T-1)}}\widetilde{x_{2T-1}} + \widetilde{r_{(2T-2)(2T-2)}}\widetilde{x_{2T-2}}$ to obtain 10 third zero-forcing soft-output solutions of $\widetilde{x_{2T-2}}$ corresponding to the third detection layer. Afterward, $M_3$ third constellation points for each of the 10 third zero-forcing soft-output solutions of $\widetilde{x_{2T-2}}$ are obtained based on the SE enumeration rule.

In FIG. 11, 10 preferred points P(3) of the third detection layer are obtained from multiple third constellation points corresponding to the 10 third zero-forcing soft-output solutions of $\widetilde{x_{2T-2}}$ by the weight enumeration rule, but the invention is not limited thereto. The 10 preferred points P(3) of the third detection layer can also be obtained by the geometric enumeration rule. In FIG. 11, the M3 third constellation points corresponding to each third zero-forcing soft-output solution include the $V_2^{th}$ third constellation point corresponding to the $V_1^{th}$ preferred point P(2). That is, for the union set $\{1 \leq V_1 \leq K_n, 1 \leq V_2 \leq M_t\}$, if $V_1V_2 \leq K_n$ is satisfied, the $K_n$ preferred points are included in the $n^{th}$ sub-set formed by the union set $\{V_1, V_2\}$, wherein $V_1$ and $V_2$ are both positive integers. In FIG. 11, the union set $\{V_1, V_2\}$ is the shadow area, and the 10 preferred points P(3) are included in 20 third constellation points in the shadow area. Any of the PEDs corresponding to the 10 preferred points P(3) is less than the PED corresponding to any of the other third constellation points.

For example, the third constellation points included in the area 1102 of FIG. 11 are a collection of those having a multiplication of $V_1$ and $V_2$ less than or equal to 10×1 (=10). The third constellation points included in the area 1104 are a collection of those having a multiplication of $V_1$ and $V_2$ less than or equal to 5×2 (=10). The third constellation points included in the area 1106 are a collection of those having a multiplication of $V_1$ and $V_2$ less than or equal to 3×3 (=9). The third constellation points included in the area 1108 are a collection of those having a multiplication of $V_1$ and $V_2$ less than or equal to 2×5 (=10). The shadow area corresponds to a union of the areas 1102, 1104, 1106 and 1108 and is the third sub-set.

When n is less than or equal to (2T−2), the value of n is added by 1. Consequently, corresponding to the $n^{th}$ detection layer, 10 preferred points P(n−1) of the (n−1)th detection layer are received and 10 $n^{th}$ zero-forcing soft-output solutions of $\widetilde{x_{2T-n+1}}$ corresponding to the $n^{th}$ detection layer are obtained. Multiple $n^{th}$ constellation points corresponding to the 10 $n^{th}$ zero-forcing soft-output solutions are selected based on the SE enumeration rule, and the 10 preferred points P(n) of the $n^{th}$ detection layer are obtained according to the PEDs corresponding to the $n^{th}$ constellation points. The 10 preferred points P(2T−1) of the (2T−1)$^{th}$ detection layer are transferred to the 2T$^{th}$ detection layer.

Figure 12:
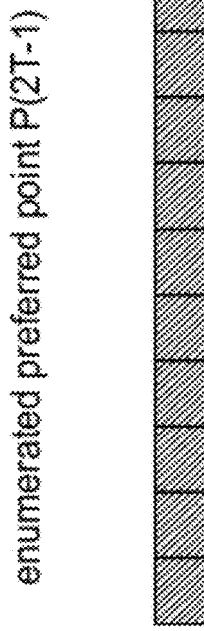
FIG. 12 shows a schematic illustration of one example of the enumerated preferred points P(2T-1) corresponding to the $2T^{th}$ detection layer and the $2T^{th}$ constellation points according to the second embodiment of the invention.

FIG. 12 shows a schematic illustration of one example of the enumerated preferred points P(2T−1) and the 2T-th constellation points corresponding to the 2T-th detection layer according to the second embodiment of the invention. Referring to FIG. 12, the 10 preferred points P(2T−1) of the (2T−1)$^{th}$ detection layer are received and substituted into $\tilde{y}_1 = \widetilde{r_{(2T)}}\widetilde{x_{2T}} + \ldots \tilde{r}_{11}\tilde{x}_1$ to obtain 10 2T$^{th}$ zero-forcing soft-output solution of $\tilde{x}_1$ corresponding to the 2T$^{th}$ detection layer. As shown by the shadow area of FIG. 12, 1 2T$^{th}$ constellation point for each of the 10 2T$^{th}$ zero-forcing soft-output solution of $\tilde{x}_1$, are obtained based on the SE enumeration rule. The 10 2T$^{th}$ constellation points are the 10 preferred points P(2T) of the 2T$^{th}$ detection layer. The preferred point of the 10 preferred points P(2T) corresponding to the least PED is the optimal solution corresponding to the T signals.

In the sphere decoding method applied to a MIMO channel disclosed in the second embodiment of the invention, an optimal solution of T signals can be obtained by merely calculating the PEDs of the corresponding number of constellation points based on the SE enumeration rule in the real domain, without having to calculate the PEDs of all the constellation points, thereby greatly reducing detection complexity of the sphere decoding method and the calculation time. Therefore, the values of the T signals outputted by T transmission antennas of a transmitting end can be quickly solved according to the R reception signals received by R reception antennas of a receiving end. Therefore, the receiving end using the sphere decoding method applied to a MIMO channel of the embodiment can have advantages of high-performance signal transmission and decoding and reducing system hardware complexity and chip area. Besides, the system can determine the values of $K_1$ to $K_{2T}$, K, and $M_t$ based on the characteristic of the MIMO channel, such that the system has the lowest packet error rate or bit error rate to maintain a brilliant signal receiving performance of the system.

The sphere decoding method applied to a MIMO channel disclosed by the above embodiments of the invention can obtain K preferred points for each detection layer by calculating the PEDs corresponding to a part of constellation points of each detection layer respectively in the complex domain and the real domain based on the SE enumeration rule. Consequently, the detection complexity of the sphere decoding method and the calculation time can be greatly reduced and the signal receiving performance of the system can be maintained.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A sphere decoding method applied to a multi-input multi-output (MIMO) channel, comprising:
enumerating a plurality of constellation points of an $n^{th}$ detection layer corresponding to a MIMO channel matrix based on an enumeration rule, and defining at least one $n^{th}$ sub-set of the $n^{th}$ detection layer;

determining a candidate range of the constellation points of the at least one $n^{th}$ sub-set according to a predetermined number K of the preferred points of the at least one $n^{th}$ sub-set, wherein K is a positive integer;

obtaining K constellation points from the at least one $n^{th}$ sub-set as preferred points according to partial Euclidean distances (PEDs) of the constellation points, wherein the at least one $n^{th}$ sub-set includes at least K constellation points;

selecting $K_n$ preferred points of the $n^{th}$ detection layer from all the K preferred points of the at least one $n^{th}$ sub-set, wherein $K_n$ is a positive integer less than or equal to a total number of the K preferred points of the at least one $n^{th}$ sub-set; and determining an optimal solution according to the $K_n$ preferred points, the method implemented by a processor on a chip to decode a signal provided over the MIMO channel.

2. The method according to claim 1, wherein the MIMO channel matrix is a complex matrix, and the enumeration rule is for enumerating the constellation points of the $n^{th}$ detection layer along a real axis and an imaginary axis, respectively.

3. The method according to claim 2, wherein, the MIMO channel matrix corresponds to first to $T^{th}$ detection layers, and the $n^{th}$ detection layer and $K_n$ correspond to at least one of a second to $(T-1)^{th}$ detection layers and at least one of $K_2$ to $K_{(T-1)}$, respectively;

the first detection layer transfers $K_1$ preferred points to the second detection layer, the second detection layer transfers $K_2$ preferred points to a third detection layer, . . . , and the $(T-1)^{th}$ detection layer transfers $K_{(T-1)}$ preferred points to the $T^{th}$ detection layer;

the $n^{th}$ detection layer obtains an enumeration status of $K_{(n-1)}$ groups of the constellation points based on the enumeration rule according to the $K_{(n-1)}$ preferred points of the $(n-1)^{th}$ detection layer, wherein the enumeration status of every group of constellation points corresponds to one group of the at least one $n^{th}$ sub-set; and the $n^{th}$ detection layer selects the preferred points according to the predetermined number K of preferred points in every group of the at least one $n^{th}$ sub-set, and transfers the $K_n$ preferred points to an $(n+1)^{th}$ detection layer.

4. The method according to claim 3, wherein the first to $T^{th}$ detection layers correspond respectively, in the QR decomposition of the MIMO channel matrix, to rows of a triangular matrix having the most "0" elements, the secondly most "0" elements, . . . , the least "0" elements.

5. The method according to claim 3, wherein the optimal solution is one of the $K_T$ preferred points of the $T^{th}$ detection layer corresponding to the least PED.

6. The method according to claim 3, wherein, each detection layer has M constellation points, M is a positive integer, and as for every group of constellation points, the enumeration rule is for enumerating $\sqrt{M}$ constellation points along the same real axis and $\sqrt{M}$ constellation points along the same imaginary axis; and the candidate range of the constellation points of the at least one $n^{th}$ sub-set is determined according to a real-part candidate range $M_1$ and an imaginary-part candidate range $M_2$, the product of $M_1$ and $M_2$ is larger than or equal to K, $M_1$ and $M_2$ both are positive integers, and $M_1$ and $M_2$ both are less than or equal to $\sqrt{M}$.

7. The method according to claim 6, wherein the candidate range of the constellation points of the at least one $n^{th}$ sub-set is a wedge-shaped range or a rectangular range.

8. The method according to claim 1, wherein the MIMO channel matrix is a real matrix, and the enumeration rule is for enumerating the constellation points of the $n^{th}$ detection layer along a single axis.

9. The method according to claim 8, wherein, the MIMO channel matrix corresponds to first to $2T^{th}$ detection layers, and the $n^{th}$ detection layer and $K_n$ correspond to at least one of the second to $(2T-1)^{th}$ detection layers and at least one of $K_2$ to $K_{(2T-1)}$, respectively;

the first detection layer transfers $K_1$ preferred points to the second detection layer, the second detection layer transfers $K_2$ preferred points to the third detection layer, . . . , and the $(2T-1)^{th}$ detection layer transfers $K_{(2T-1)}$ preferred points to the $2T^{th}$ detection layer;

the $n^{th}$ detection layer obtains an enumeration status of $K_{(n-1)}$ groups of the constellation points based on the enumeration rule and according to the $K_{(n-1)}$ preferred points of the $(n-1)^{th}$ detection layer, wherein the enumeration status of $K_{(n-1)}$ groups of constellation points corresponds to one group of the at least one $n^{th}$ sub-set; and the $n^{th}$ detection layer selects $K_n$ preferred points from the group of the at least one $n^{th}$ sub-set, and transfers the $K_n$ preferred points to an $(n+1)^{th}$ detection layer.

10. The method according to claim 9, wherein the first to $2T^{th}$ detection layers correspond respectively, in the QR decomposition of the MIMO channel matrix, to rows of a triangular matrix having the most "0" elements, the secondly most "0" elements, to the least "0" elements.

11. The method according to claim 9, wherein $K_1$ preferred points of the first detection layer are determined from $K_1$ solutions which are around one solution with the least PED of the first detection.

12. The method according to claim 9, wherein the optimal solution is one of the $K_{2T}$ preferred points of the $2T^{th}$ detection layer corresponding to the least PED.

13. The method according to claim 9, wherein, each detection layer has $\sqrt{M}$ constellation points, $\sqrt{M}$ is a positive integer, and as for every group of constellation points, the enumeration rule is for enumerating $\sqrt{M}$ constellation points along the single axis; and the $n^{th}$ detection layer enumerating the $K_{(n-1)}$ groups of $\sqrt{M}$ constellation points along the single axis according to the $K_{(n-1)}$ preferred points of the $(n-1)^{th}$ detection layer.

14. The method according to claim 13, wherein the candidate range of the constellation points of the $n^{th}$ detection layer is determined according to a candidate range $K_i$ of preferred points and a candidate range $M_i$ along the single axis, a product of $K_i$ and $M_i$ is larger than K, $K_i$ and $M_i$ both are positive integers, $K_i$ is less than or equal to $K_{(n-1)}$, and $M_i$ is less than or equal to $\sqrt{M}$.

15. The method according to claim 14, wherein the candidate range of the constellation points of the at least one $n^{th}$ sub-set is a wedge-shaped range or a rectangular range.

16. The method according to claim 8, wherein the single axis corresponds to one of a real axis and an imaginary axis.

17. The method according to claim 1, wherein the K preferred points of the at least one $n^{th}$ sub-set are the K constellation points with the least PEDs.

18. The method according to claim 1, wherein the enumeration rule is Schnorr & Euchner (SE) enumeration rule.

* * * * *